United States Patent

[11] 3,613,996

| [72] | Inventor | Carole S. Tanner<br>San Diego, Calif. |
|---|---|---|
| [21] | Appl. No. | 838,851 |
| [22] | Filed | July 3, 1969 |
| [45] | Patented | Oct. 19, 1971 |
| [73] | Assignee | Rohr Corporation |

[54] EJECTOR WITH SUPPRESSOR CHUTES
3 Claims, 3 Drawing Figs.

[52] U.S. Cl. .................................................. 239/265.13,
239/265.39
[51] Int. Cl. .................................................. B64d 33/04
[50] Field of Search ........................................... 239/265.37,
265.39, 8, 265.13, 265.29, 265.17; 181/35

[56] References Cited
UNITED STATES PATENTS

| 3,524,588 | 8/1970 | Duval | 239/265.13 |
|---|---|---|---|
| 2,694,898 | 11/1954 | Stauff | 239/265.37 |
| 2,779,157 | 1/1957 | Palmer | 239/265.37 |
| 2,956,400 | 10/1960 | Ferri | 239/265.39 |
| 2,669,834 | 2/1954 | Helms, Jr. | 239/265.39 |
| 2,970,432 | 2/1961 | Cocoros et al. | 239/265.39 |
| 3,032,981 | 5/1962 | Lawler | 239/265.13 |
| 3,441,219 | 4/1969 | Turner | 239/265.39 X |

FOREIGN PATENTS

| 590,540 | 1/1960 | Canada | 239/265.39 |

Primary Examiner—Lloyd L. King
Attorney—George E. Pearson

ABSTRACT: System includes ejector ring mounted behind nozzle of jet engine is to induce ambient air and mix it with exhaust gas stream. Mixing is increased an further air added and mixed by injecting discrete streams of air into interior of ring from points spaced around periphery. Streams enter transverse to flow of gaseous mixture. In preferred form, ring has longitudinally extending air passages with transversely pivoted vanes which swing to transverse angle to open passages and induce the additional air streams. Vanes lie flush with wall of injector ring in retracted position and extend inwardly and outwardly of the wall in deployed position.

PATENTED OCT 19 1971 3,513,996
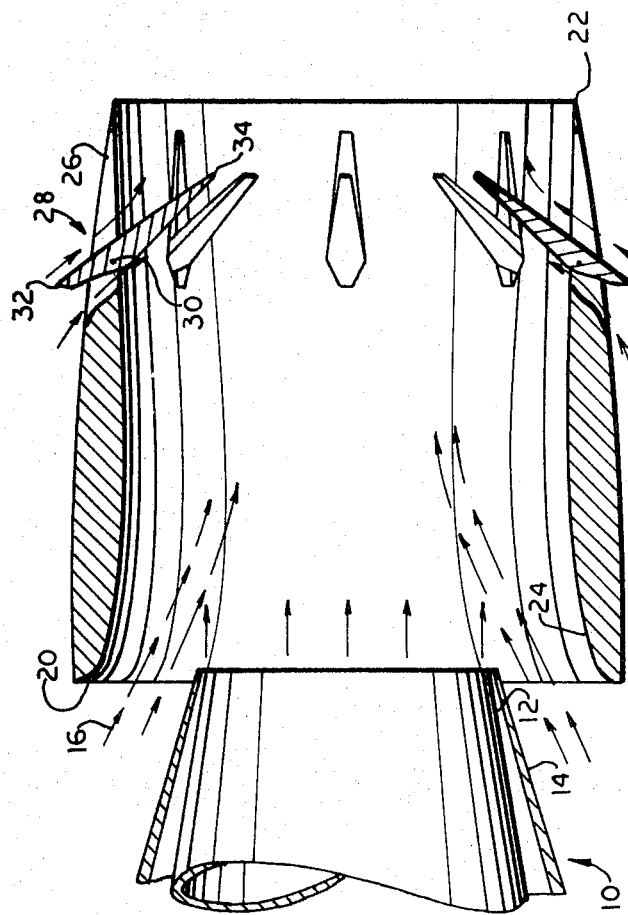
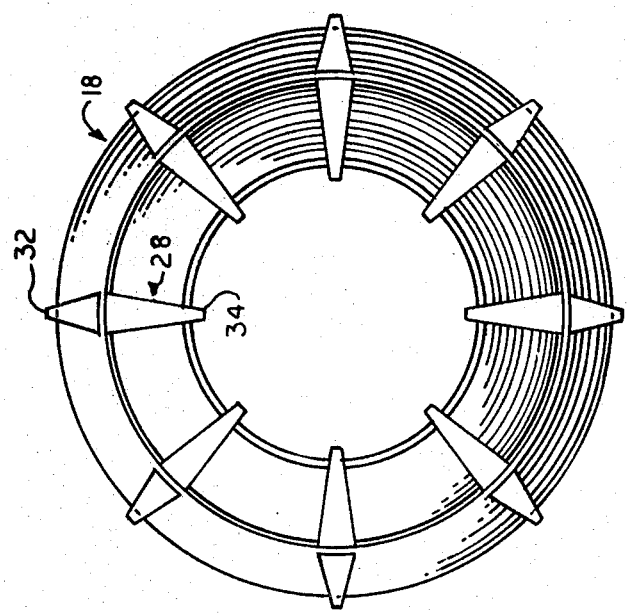
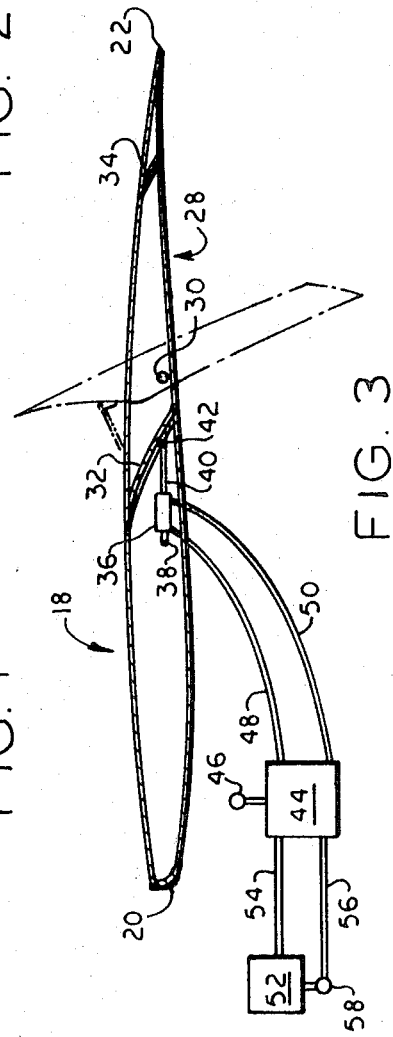
INVENTOR.
CAROLE S. TANNER
BY Edwin D. Grant
ATTORNEY

EJECTOR WITH SUPPRESSOR CHUTES

BACKGROUND OF The INVENTION

This invention lies in the field of gas turbine or jet engines which produce reaction thrust by ejecting a high velocity stream of gas from the exhaust nozzle or tailpipe of the gas turbine. One of the problems of airplanes equipped with jet engines, on which a great deal of effort has been expended, is that the exhaust gas stream creates a very high level of sound energy or "noise" in a wide range of frequencies, and a portion of this noise reaches the ground from low-flying airplanes at an energy level which is not acceptable to the public.

The invention is directed to devices which reduce the noise level by mixing free stream air with the exhaust gas stream, and it is more particularly directed to apparatus in which an ejector ring is located at the discharge zone. In this type of apparatus an elongate generally cylindrical ring is mounted at the rear of the engine compartment in general continuation of the nacelle or other body surrounding the engine. The leading edge of the ring is spaced downstream of the body a short distance to provide a generally annular gap through which the high velocity gas stream draws ambient air. The air surrounds the exhaust gas stream and the shearing action creates turbulence at the interface and consequent mixing of the ambient air with the outer portions of the gas stream. The resulting cooling of the gas reduces the sound power output in known manner.

SUMMARY OF THE INVENTION

The present invention provides a means of greatly increasing the mixing action in a very simple manner and also provides additional air for mixing and cooling. This function is accomplished with very few components and a simple control mechanism which add very little to the weight or complexity of the airplane.

Generally stated, the system operates by injecting a plurality of discrete streams of ambient air into the interior of the ejector ring from points spaced around its periphery at a locus intermediate the length of the ring. These streams follow paths transverse to the direction of flow of the gaseous mixture, generally radially toward the longitudinal axis of the ring. They thus penetrate the core which enhances the mixing of the gas with the original ambient air. In addition they are also thoroughly mixed with the flow and provide further cooling. The total result is a greatly increased suppression of the jet noise.

In the presently preferred embodiment, the ejector ring is provided with a plurality of air passages extending through its wall from the exterior to the interior. These passages are spaced around the periphery of he ring in a general plane, located intermediate the leading edge and the trailing edge. In each passage a vane or chute is pivotally mounted at a point rearward of its leading edge for rotation about an axis generally tangential to the ring. Suitable means, such as servomotors, are provided to rotate the vanes in unison.

In a first position the vanes lie generally flush with the wall of the ring and block the passages against airflow. Actuation by the servomotors swings them to their second position in which their longitudinal axes are transverse to the direction of flow through the ring and they converge downstream. Their forward portions intercept the ambient air and their aft portions intercept the flow of gaseous mixture. Some intercepted ambient air flows in on the forward face of the vane and more ambient air flows in along the aft surface of the vane because of the negative pressure. Thus the discrete streams drive into the core of the flow and cause the previously mentioned mixing and cooling.

BRIEF DESCRIPTION OF THE DRAWINGS

Various other advantages and features of novelty will become apparent as the description proceeds in conjunction with the accompanying drawings, in which:

FIG. 1 is a schematic side-elevational view, partly in section, of the apparatus incorporating the invention;

FIG. 2 is a schematic rear elevational view of the apparatus; and

FIG. 3 is a schematic side elevational view of one of the vanes and suitable control means therefor.

DESCRIPTION OF PREFERRED EMBODIMENT

The general arrangement illustrated in FIG. 1 shows the invention incorporated in a typical ejector ring type of suppressor system. A jet engine, not shown, is encased in a nacelle or other streamlined body 10, and is provided with a rearwardly discharging nozzle 12. Fairing 14 extends from the body to the nozzle exit to form one wall of an annular flow path 16 for entry of ambient air. A generally cylindrical elongate streamlined ejector ring 18 has a leading edge 20 spaced downstream from body 10 and a trailing edge 22. The inner surface 24 of the ring adjacent the leading edge is faired to define the second wall of the flow path 16. As is known, the high velocity gas discharge from the nozzle draws ambient air in through flow path 16. This air completely surrounds the gas stream, and the difference in velocity produces a shearing action which causes mixing of the air with the outer portion of the gas stream. However, the high velocity precludes optimum mixing within the ring.

At a locus intermediate the leading and trailing edges, ring 18 is provided with a plurality of air passages 26 extending therethrough at spaced points around its periphery. Each passage is narrow and elongate and extends generally fore and aft. In each passage a chute or vane 28 of corresponding form is pivotally mounted by means of pivot pin 30 for rotation about an axis which is transverse of the longitudinal axis and tangential of the cylindrical surface of the ring. The pivot axis is located at an intermediate point between the leading edge 32 and the trailing edge 34 of the vane, preferably at about the third-point.

In a first position, shown in FIG.3, each vane lies substantially flush with the wall of the ejector ring and fills its passage 26, thus blocking flow therethrough, and it has no effect on flow of the gaseous mixture through the ring. In the second position, best shown in FIGS. 1 and 2, each vane has been swung about 45° and its longitudinal axis converges downstream toward the longitudinal axis of the ring. The trailing edge extends a considerable distance inwardly while the leading edge extends a short distance beyond the outer surface of the ring.

The spaced trailing ends of the vanes projecting into the flow at a downstream angle apply discrete radially inwardly directed forces acting transversely to the flow of gaseous mixture, thus producing turbulence which increases the mixing at the core of the flow. The leading ends of the vanes intercept the slipstream air which then flows inward along the forward face of the vane. In addition, the attitude of the vane produces a negative pressure on its aft side and more air flows in along it. These air streams drive into the core and produce further turbulence and mixing of the gaseous mixture and they further add to the total mass of cooling air. All of these actions combine to produce the maximum possible mixing of air and gas and hence greatly improve the effectiveness of the sound suppression system.

A control system for the chutes or vanes is shown in FIG. 3, where a typical vane 28 is shown in retracted position in passage 26 flush with the wall of ring 18. A servocylinder 36 is pivotally connected at 38 to the framework of the ring, and a piston rod 40 is connected at one end to a piston, not shown, and at the other end to vane 28 by means of pivot 42. When the piston and rod are extended, the vane is moved to the dotted line position. Control means for the servomotor include a valve 44 with a control lever 46 connected by conduits 48 and 50 to the head end and rod end of the cylinder 36. A reservoir 52 is connected to the valve by return conduit 54 AND BY SUPPLY CONDUIT 56 IN WHICH IS INCORPORATED A PUMP 58.

The chute or vane 28 may conform to the surfaces of the ejector ring as shown in FIG. 3 or it may be a flat plate or a plate with a V-shaped or arcuate cross section.

It will apparent the invention provides means for greatly increasing the effectiveness of an ejector ring-type sound suppression system in a very simple manner and with a minimum of added weight and complication.

What is claimed as new and useful and desired to be secured by U.S. Letters Pat. is:

1. A sound suppression system for use in combination with a jet engine encased in a streamlined body and having a rearwardly discharging exhaust gas nozzle, comprising: an elongate ejector ring adapted to be mounted immediately behind and concentric with the nozzle to surround the discharge zone of the nozzle and to contain and direct the flow of the exhaust gas stream; said ring being dimensioned to continue the streamlined configuration of the body and having a leading edge spaced downstream of the body to define a peripheral gap for the entry of slipstream air to surround and mix with the gas stream to cool the latter; pilot operable means to apply discrete radially inwardly directed forces within said ring at spaced points around its periphery acting transversely to the flow of gaseous mixture therethrough to increase the mixing effect and further suppress the sound power level; the wall of the ejector ring being provided with air passages through its wall at spaced points around its periphery for the flow of ambient air from the exterior of the ring to the interior thereof; a vane mounted in each of said passages movable between a first position blocking said passage and a second position forming a flow path for the ambient air; and said vanes being pivotally mounted in the wall of said ring and swingable to said first position substantially flush with the inner surface of the ring and said second position extending inwardly toward the longitudinal axis of the ring.

2. A sound suppression system for use in combination with a jet engine encased in a streamlined body and having a rearwardly discharging exhaust gas nozzle, comprising; an elongate ejector ring adapted to be mounted immediately behind and concentric with the nozzle to surround the discharge zone of the nozzle and to contain and direct the flow of the exhaust gas stream; said ring being dimensioned to continue the streamlined configuration of the body and having a leading edge spaced downstream of the boy to define a peripheral gap for the entry of slipstream air to surround and mix with the gas stream to cool the latter; pilot operable means to apply discrete radially inwardly directed forces within said ring at spaced points around its periphery acting tranversely to the flow of gaseous mixture therethrough to increase the mixing effect and further suppress the sound power level; the wall of the ejector ring being provided with air passages through its wall at spaced points around its periphery for the flow of ambient air from the exterior of the ring to the interior thereof; a vane mounted in each of said passages movable between a first position blocking said passage and a second position forming a flow path for the ambient air; and said vanes in said second position extending inwardly toward the longitudinal axis of the ring at a downstream angle to produce a negative pressure on the aft surface of each vane inducing ambient airflow therealong into the interior of the ring.

3. A sound suppression system for use in combination with a jet engine encased in a streamlined body and having a rearwardly discharging exhaust gas nozzle, comprising: an elongate ejector ring adapted to be mounted immediately behind and concentric with the nozzle to surround the discharge zone of the nozzle and to contain and direct the flow of the exhaust gas stream; said ring being dimensioned to continue the streamlined configuration of the body and having a leading edge spaced downstream of the body to define a peripheral gap for the entry of slipstream air to surround and mix with the gas stream to cool the latter; pilot operable means to apply discrete radially inwardly directed forces within said ring at spaced points around its periphery acting transversely to the flow of gaseous mixture therethrough to increase the mixing effect and further suppress the sound power level; the wall of the ejector ring being provided with air passages through its wall at spaced points around its periphery for the flow of ambient air from the exterior of the ring to the interior thereof; a vane mounted in each of said passages movable between a first position blocking said passage and a second position forming a flow path for the ambient air; said vanes being pivotally mounted in the wall of the ring at points intermediate the length of each vane and lying substantially flush with the inner surface of the ring in said first position and substantially filling the passage; said vanes in said second position converging downstream with their forward ends extending beyond the exterior of the ring and their aft ends extending into the interior of the ring; said forward ends intercepting the slipstream and guiding ambient air inward along the forward faces of the vanes; and said vanes also producing negative pressure on their aft faces to induce ambient air to flow inward therealong.